No. 862,633. PATENTED AUG. 6, 1907.
D. R. GREEN.
CENTRIFUGAL CREAM SEPARATOR.
APPLICATION FILED SEPT. 13, 1906.

WITNESSES:

David R. Green, INVENTOR

BY

ATTORNEY

UNITED STATES PATENT OFFICE.

DAVID R. GREEN, OF WATERLOO, IOWA.

CENTRIFUGAL CREAM-SEPARATOR.

No. 862,633.　　　　　Specification of Letters Patent.　　　　　Patented Aug. 6, 1907.

Application filed September 13, 1906. Serial No. 334,372.

*To all whom it may concern:*

Be it known that I, DAVID R. GREEN, a citizen of the United States of America, and a resident of Waterloo, Blackhawk county, Iowa, have invented certain new and useful Improvements in Centrifugal Cream-Separators, of which the following is a specification.

My invention relates to centrifugal cream separators, and the object of my improvements is to provide means for causing the whole milk to circulate under centrifugal stress back and forth over the disks of the liner in such a manner as to most efficiently separate all the cream therefrom. This object I have accomplished by the means which are hereinafter described and claimed, and which are illustrated by the drawings hereto annexed, in which—

Figure 1:
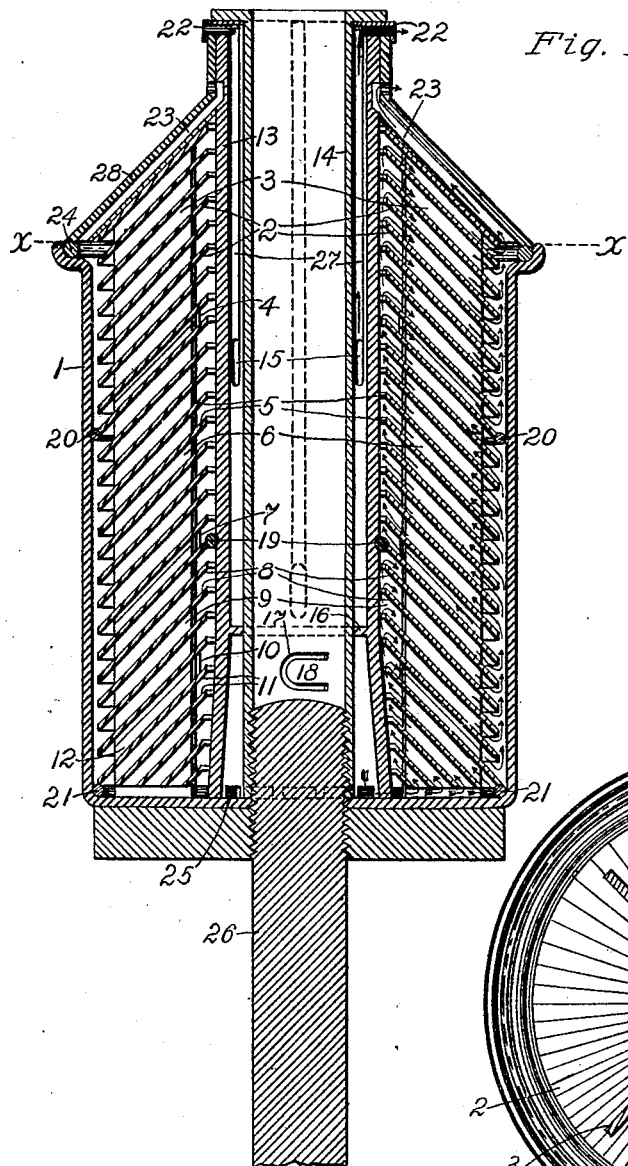
Figure 2:
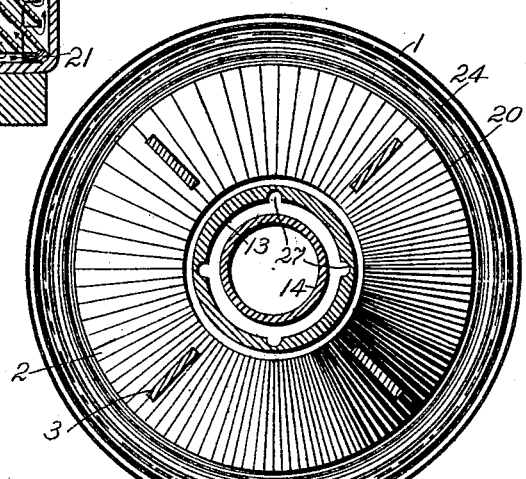

Figure 1 is a central vertical axial section of the separator bowl containing my improved liner, and Fig. 2 is a horizontal section of said liner showing the bowl with the cover removed and taken on the line x x of Fig. 1.

Similar numbers refer to similar parts throughout the several views.

I have shown in Fig. 1 a separator bowl of a well known type 1, having a cover 28, the latter being clamped upon said bowl by means of a hollow clamping cylinder 14, a circular gasket 24 being interposed between the edges of said cover and bowl to provide a liquid tight connection therebetween. The lower part of said bowl is provided with an axial perforation interiorly threaded for the reception of the exteriorly threaded upper end of the spindle 26, the upper end of the latter furthermore projecting upward into the interior of the bowl a sufficient distance so as to be securely screwed into the interiorly threaded lower end of the clamping cylinder 14. The upper end of said clamping cylinder 14 is open and forms the inlet tube for the entering milk to be separated. The lower end of said clamping tube is closed by means of the upper end of said spindle 26, but has on opposite sides just above said spindle top a horse-shoe shaped opening 17 whose intermediate tongue-piece 18 is bent inwardly in order to deflect tangentially the current of full milk passing therethrough. An outer cylinder 13 is placed about said clamping cylinder 14 and spaced away therefrom a suitable distance, the upper end of said cylinder being closed by the upper flanges of the cylinder 14. The cylinder 13 has at a point a short distance above the horse-shoe shaped opening 17 an inner ring-shaped flange or shelf which fits tightly about the exterior periphery of the cylinder 14, forming a circular chamber concentric with the cylinder 14 and around its lower portion. The lower end of said cylinder 13 rests upon the bottom of the bowl 1 and is supplied with a plurality of openings 25 at its lower end. Said cylinder 13 is provided with slotted perforations 15 at different points to permit the passage therethrough and into the interior of the cylinder of separated cream.

Vertical grooves 27 are provided on the inner periphery of the cylinder 13 extending upward vertically from the perforations 15 to the cream exits 22 to form conduits for the escaping cream. I have placed about the cylinder 13, spaced away from and concentric therewith, a vertical series of nested separating devices, the outer edges of said devices being also spaced away a sufficient distance from the inner periphery of said bowl. All of said separating devices are spaced apart and supported in the same relation to each other by means of uprights affixed thereto as follows. The lowermost separating disks 11 are supported by the uprights 12 the upper ends of said uprights projecting a short distance. Another similar nest of separating disks 8 are superposed upon the former nest, the lower ends of their supporting uprights 9 projecting downward a short distance, pieces 10 being attached to said uprights 9 adapted to contact with one side of each of the uprights 12, to hold both nests in the same relative position, but detachable therefrom. In like manner another nest of conical separating disks 5 fixed upon supporting uprights 6 is superposed upon the last described nest in the same manner, the pieces 7 attached to the lower projecting ends of the uprights 6 contacting with the upwardly projecting ends of the uprights 9. A topmost nest of conical separating devices 2 fixed on the supporting uprights 3 is in like manner superposed upon the nest last described, the pieces 4 on the projecting lower ends of the uprights 3 contacting with the projecting upper ends of the uprights 6. All the said nests when superposed thus form a regular series of separating devices spaced apart equal distances, the supporting uprights being made in sections so that the different nests of disks may be removed separately to permit of the introduction or removal of the ring gaskets 19, 20 and 21. The gasket 21 is first inserted to fit within the bowl at the angle of junction of the sides and bottom thereof. The lowermost nest of separating devices is then introduced into the bowl, the outer lower edge of the uppermost disk 11 resting upon and forming a water-tight connection with the gasket 21. A nest of separating disks 8 is then superposed upon the nest of disks 11 and a gasket 19 is then fitted about the exterior periphery of the cylinder 13 so as to effect a water-tight connection between said cylinder and the upper edge of the upper disk 8. The nest of disks 5 is then superposed upon the nest of disks 8 in a similar manner and a gasket 20 introduced, placed so as to form a water-tight connection between the inner periphery of the separator bowl and the outer lower edge of the uppermost disk 5. The nest of separating disks 2 is then superposed upon the nest of separating disks 5 in the same manner, the cover 28 then being clamped down into place to secure said nests of separating devices securely in position by the clamping means heretofore described. Tubular conduits 23 are attached to the inner side of the separator cover 28 and have their inner ends near the inner periphery of the bowl 1.

When by means of any suitable source of power, the bowl 1 has attained the proper speed of rotation, the whole milk is introduced into the inlet tube 14 thence being sprayed tangentially into the lower compartment of the cylinder 13 whence under the influence of centrifugal force it passes through the openings 25 into the interior of the bowl along the bottom thereof. As shown in Fig. 1, the arrows then depict the direction of movement of the current of separating milk in its passage over and between the conical separating devices. Inasmuch as the gasket 21 which is interposed to form a water-tight connection between the inner periphery of the bowl and the lower outer edge of the uppermost disk 11 prevents egress of the milk directly upward along the surface of the inner periphery of the bowl the current of the milk is deflected so as to move upwardly and inwardly between the disks 11 and up to the upper inner edge of the uppermost disk 11, whence it is deflected outward and downward to the inner periphery of the bowl. The gasket 19 operates to thus deflect the current downward, the milk then flowing upwardly along the inner periphery of the bowl as far as the gasket 20 which in turn deflects the milk inwardly, the stream being divided and flowing between the disks 5 toward the outer periphery of the cylinder 13 and thence upwardly past the upper inner edge of the uppermost disk 5 the ascending current then being sprayed outwardly between the disks 3 to the inner periphery of the bowl the skimmed milk, being the heavier portion of the liquid, then escaping from the bowl through the milk outlets 23. That portion of the cream which is separated below the gasket 19 escapes through the lowermost slotted opening 15 into the cream zone between the cylinders 13 and 14. All the cream which is separated above the gasket 19 finds its way to the uppermost slotted openings 15 and then ascends along the grooves 27 to the cream outlet 22.

Inasmuch as it is desirable to keep the milk circulating in the bowl over the surfaces of the separating devices until the minuter particles of cream have time to thoroughly separate therefrom, it is apparent that proper means should be adopted to so confine the current that it may not rapidly pass through such separating devices to the inner periphery of the bowl and thence issue through the milk exit carrying with it a considerable portion of unseparated cream particles. My improved liner is designed to effect that end, as it effects such purpose by carrying the current of separating milk alternately back and forward over the whole series of separating devices up to the point of exit. The whole of the surfaces of said separating devices are thus equally utilized and in the long circuitous passage over them the smallest cream particles are given full opportunity to separate from the skimmed milk. Throughout about one half of the extent of said liner, those parts through which the current is deflected inwardly, the separation and movement inwardly of the cream particles are expedited on account of such particles not having to encounter the increased friction of the heavier watery particles moving in the other direction as is the case in those parts of a liner where the current is directed outwardly. Less power is thus required in the operation of the separator.

Having described my invention, what I claim as new, and desire to secure by Letters Patent, is—

1. A centrifugal cream separator, comprising the combination of a bowl having a milk inlet-tube and milk and cream exits, a plurality of separating devices spaced apart and superposed about said milk-inlet-tube, and removable seals secured between the inner edges of certain predetermined separating devices and the milk inlet-tube, and other removable seals secured between the outer edges of certain other predetermined separating devices and the inner periphery of the bowl.

2. A centrifugal cream separator, comprising the combination of a bowl having a milk inlet-tube and milk and cream exits, a plurality of superposed separating devices spaced apart and located about said milk inlet-tube so as to leave channels between said devices and the said tube and the inner periphery of the bowl respectively, and removable seals placed so as to obstruct such channels at predetermined places alternately between the said devices and the said milk inlet-tube and the inner periphery of the bowl.

3. A centrifugal cream separator, comprising the combination of a bowl provided with milk and cream exits, a milk inlet-tube therein in communication with the interior of the bowl near its base, a cream exit-tube about and spaced away from said milk inlet-tube, perforated for entry of cream therethrough but closed above the exits of said milk inlet-tube, a plurality of superposed separating devices spaced apart and located about said cream-exit-tube so as to leave channels therebetween and between the outer edges of said devices and the inner periphery of said bowl, and removable seals secured between said devices and the cream exit-tube and the inner periphery of the bowl, such seals being placed to alternately obstruct said inner and outer channels at certain predetermined places.

Signed at Waterloo, Iowa, this 27th day of Aug. 1906.

DAVID R. GREEN.

Witnesses:
G. C. KENNEDY,
M. E. KENNEDY.